N. NILSON.
ROTARY PLOW.
APPLICATION FILED MAY 3, 1909.
1,050,987.
Patented Jan. 21, 1913.
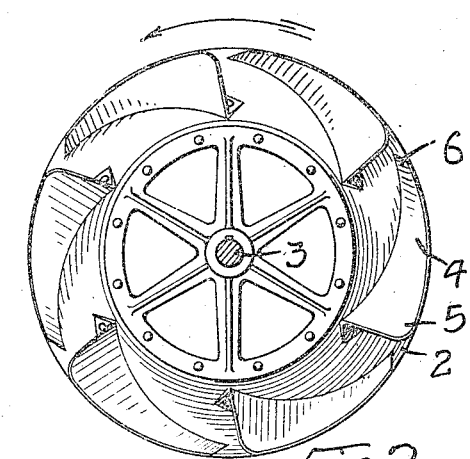
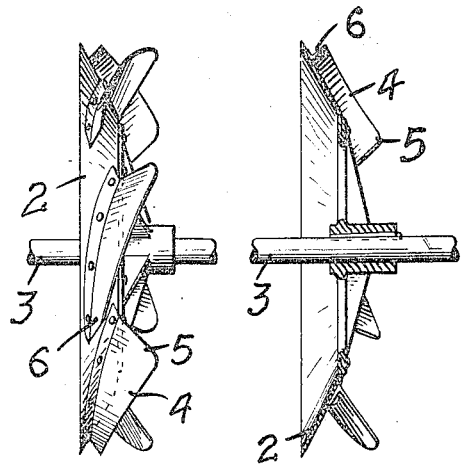
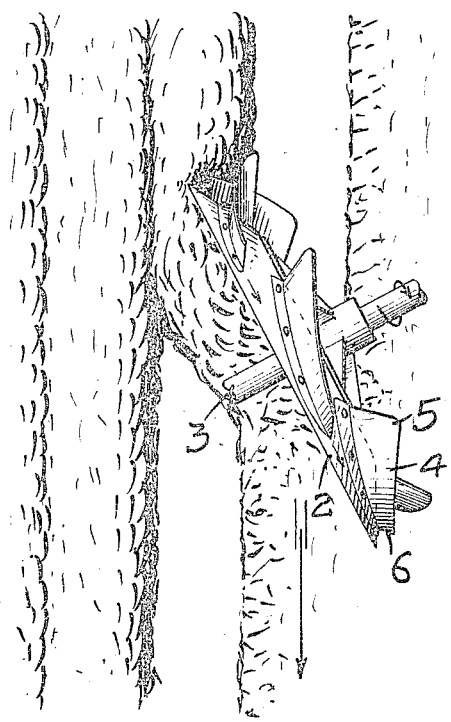
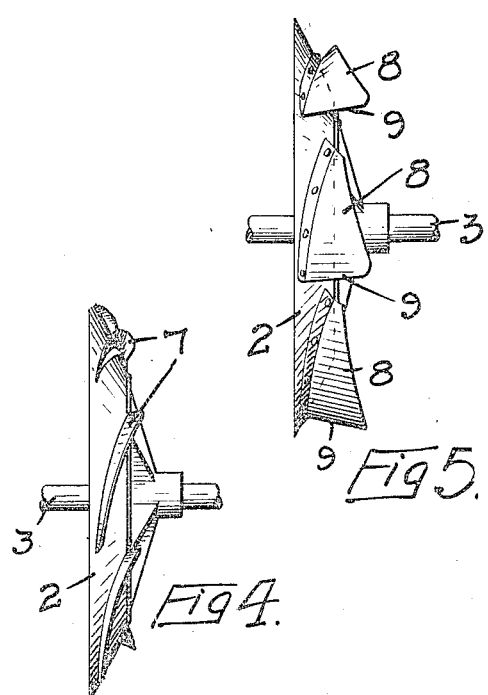
WITNESSES
INVENTOR
NILS NILSON
BY Paul & Paul
ATTORNEYS

UNITED STATES PATENT OFFICE.

NILS NILSON, OF WAYZATA, MINNESOTA.

ROTARY PLOW.

1,050,987. Specification of Letters Patent. Patented Jan. 21, 1913.

Application filed May 3, 1909. Serial No. 493,537.

*To all whom it may concern:*

Be it known that I, NILS NILSON, of Wayzata, Hennepin county, Minnesota, have invented certain new and useful Improvements in Rotary Plows, of which the following is a specification.

The object of my invention is to provide means in connection with a disk plow, which will cut up the soil on the land side of the disk, while the furrow is being turned on the opposite side.

A further object is to provide means, which will have a tendency to draw the plow into the soil and provide additional traction.

A still further object is to provide a plow having a large capacity and one which will be comparatively simple and inexpensive to manufacture and maintain.

In the accompanying drawings, forming part of this specification, Figure 1 is a plan view, illustrating the rotary plow at work, Fig. 2 is a view looking toward the convex side of the disk, showing the traction blades or wings thereon, Fig. 3 is an edge view of the plow, and Fig. 3ª is a sectional view, Fig. 4 illustrates a modified construction with a narrow type of wing or blade, Fig. 5 illustrates the blades reversed on the disk, having their wide cutting edges at the forward end of the wing or blade.

In the drawing, 2 represents a disk, concave on one side and convex on the other, as usual in disks of this type, mounted on a shaft 3. It is my purpose to drive this shaft at a speed greater than the forward movement of the machine, and to increase the traction and draw the disk into the soil I provide a series of blades or wings 4, secured to the convex face of the disk. These blades are preferably arranged as shown in Fig. 2, having a wide heel portion 5 tapering to a narrow beak or nose 6, the heel portion of each blade being located about midway between the periphery and the axis of the disk and the nose portion near the edge or periphery of the disk. The blades thus lie obliquely on the curved surface of the disk and I prefer to curve them slightly from end to end, as indicated in Figs. 1 and 3, and also incline them with respect to the axis of the disk. By inclining the blades to the axis of the disk, I mean that they are outwardly turned or inclined toward the periphery of the disk, so that the angles formed between their inner faces and the surface of the disk will be greater than right angles. This inclination of the blades will cause them to resist pressure on the opposite side of the disk. The taper of the wings will allow their forward ends to enter the soil easily and as the disk revolves faster than it travels forward, the wings will work into the soil and increase the traction of the plow and hold it down to the work. The pressure of the soil on the concave side of the disk will tend to work it laterally into the land. This will be off-set by the inclination of the wings, which, digging into the soil, will tend to counter-act the pressure on the opposite side and hold the disk in proper relation to the land and the furrow that is being formed. The wings, operating on the land side of the disk, will have the effect of cutting up the soil, so that when the next furrow is turned, the soil will be thoroughly loosened and better results obtained.

In operating the disk in sod, I prefer to employ the narrow blades 7, illustrated in Fig. 4, which increase the traction of the disk, but will not cut into the sod and chop it up as much as the larger and wider wings would do.

In Fig. 5, I have shown another modification, in which the wings 8 are provided with broad cutting edges 9, which are adapted to extend substantially across into the soil on the land side of the disk a distance equal substantially to the width of a furrow, thus cutting up and loosening the soil preparatory to the turning of the furrow by the disk. It will be understood that any number of these disks may be mounted on the shaft, their operation being substantially the same as that of the disk described above.

I claim as my invention:

A rotary plow comprising a concavo-convex disk, a series of wings secured to the convex side of said disk, said wings being curved longitudinally and gradually decreasing in width from their rear toward their forward ends, said wings extending obliquely on the surface of said disk with their forward ends adjacent to the periphery thereof, the outer face of each wing forming an acute angle with the surface of said disk, and the inner face of each wing forming an obtuse angle with the surface of said disk, the space between adjacent wings extending spirally on the surface of the disk, the angle of said wings with respect to the disk counter-acting the pressure of the earth on the convex side of the disk when the wings enter the soil.

In witness whereof, I have hereunto set my hand this 28th day of April, 1909.

NILS NILSON.

Witnesses:
JESSIE M. SULLIVAN,
J. A. BYINGTON.